United States Patent
Augst (10) Patent No.: US 10,457,284 B2
(45) Date of Patent: Oct. 29, 2019

(54) METHOD, DEVICE AND MOBILE USER APPARATUS FOR ADAPTING AN ENERGY SUPPLY OF A DRIVE SYSTEM OF A VEHICLE

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 162 days.

(21) Appl. No.: 15/491,306

(22) Filed: Apr. 19, 2017

(65) Prior Publication Data

US 2017/0305424 A1 Oct. 26, 2017

(30) Foreign Application Priority Data

Apr. 21, 2016 (DE) .................... 10 2016 206 800

(51) Int. Cl.
*B60W 30/18* (2012.01)
*G07C 5/08* (2006.01)
(Continued)

(52) U.S. Cl.
CPC .............. *B60W 30/18* (2013.01); *B60L 3/12* (2013.01); *B60L 15/2045* (2013.01);
(Continued)

(58) Field of Classification Search
CPC ....... B60W 30/18; B60L 3/12; B60L 15/2045; B60L 2240/622; B60L 2250/18;
(Continued)

(56) References Cited

U.S. PATENT DOCUMENTS 5,915,368 A * 6/1999 Ishida .................. F02D 41/047
123/675
2011/0173991 A1* 7/2011 Dean ........................ F01D 1/32
60/801
(Continued)

FOREIGN PATENT DOCUMENTS

DE 102 26 143 A1 1/2004
DE 103 55 412 A1 7/2005
(Continued)

OTHER PUBLICATIONS

German Search Report issued in counterpart German Application No. 10 2016 206 800.8 dated Jan. 19, 2017 with partial English-language translation (nineteen (19) pages).

*Primary Examiner* — Joseph J Dallo
*Assistant Examiner* — Yi-Kai Wang
(74) *Attorney, Agent, or Firm* — Crowell & Moring LLP (57) ABSTRACT

A method adapts an energy supply of a vehicle drive system, where values of at least a first energy utilization characteristic variable which represents a first energy utilization process in the vehicle are determined, and values of at least one parameter which represents at least one peripheral condition of the energy utilization during the first energy utilization process are determined. A mathematical relationship is determined between these values, after which a profile data record is made which contains a data record and/or learning data on the basis of the mathematical relationship. As a function of the profile data record, at least one adaptation information item for adapting the energy supply of the drive system of the vehicle for a second energy utilization process is determined, and/or an adaptation information item for adapting the energy supply of the drive system of a second vehicle for an energy utilization process is determined.

22 Claims, 1 Drawing Sheet

(51) Int. Cl.
*F02D 41/14* (2006.01)
*F02D 41/00* (2006.01)
*B60L 3/12* (2006.01)
*B60L 15/20* (2006.01)
*F02D 41/02* (2006.01)

(52) U.S. Cl.
CPC ..... *F02D 41/0025* (2013.01); *F02D 41/1406* (2013.01); *G07C 5/0808* (2013.01); *G07C 5/0841* (2013.01); *B60L 2240/622* (2013.01); *B60L 2250/18* (2013.01); *F02D 41/0027* (2013.01); *F02D 41/021* (2013.01); *F02D 41/1445* (2013.01); *F02D 41/1498* (2013.01); *F02D 2200/0612* (2013.01); *Y02T 10/645* (2013.01); *Y02T 10/72* (2013.01); *Y02T 10/7283* (2013.01); *Y02T 10/7291* (2013.01); *Y02T 90/16* (2013.01); *Y02T 90/162* (2013.01)

(58) Field of Classification Search
CPC ............. F02D 41/0025; F02D 41/1406; F02D 41/0027; F02D 41/021; F02D 41/1445; F02D 41/1498; F02D 2200/0612; G07C 5/0808; G07C 5/0841
USPC ........................................................ 701/111
See application file for complete search history.

(56) References Cited

U.S. PATENT DOCUMENTS

| | | |
|---|---|---|
| 2013/0030616 A1 | 1/2013 | Syed et al. |
| 2013/0143631 A1* | 6/2013 | Platzer ................. A63H 18/005 463/6 |
| 2015/0266390 A1* | 9/2015 | Shin .................... B60L 11/1851 701/22 |
| 2016/0001671 A1* | 1/2016 | Mori ................... B60L 11/1861 701/22 |
| 2016/0244062 A1 | 8/2016 | Tudosie |
| 2017/0268948 A1* | 9/2017 | List ............................ G01L 5/13 |
| 2017/0306868 A1* | 10/2017 | Tang .................. F02D 19/0623 |

FOREIGN PATENT DOCUMENTS

| | | |
|---|---|---|
| DE | 10 2012 212 396 A1 | 1/2013 |
| DE | 10 2013 220 604 A1 | 4/2015 |

* cited by examiner

METHOD, DEVICE AND MOBILE USER APPARATUS FOR ADAPTING AN ENERGY SUPPLY OF A DRIVE SYSTEM OF A VEHICLE

CROSS REFERENCE TO RELATED APPLICATIONS

This application claims priority under 35 U.S.C. § 119 from German Patent Application No. 10 2016 206 800.8, filed Apr. 21, 2016, the entire disclosure of which is herein expressly incorporated by reference.

BACKGROUND AND SUMMARY OF THE INVENTION

The invention relates to a method, to a device and to a mobile user apparatus for the improved adaptation of an energy supply of a drive system of a vehicle.

Modern drive systems of motor vehicles with combustion engines can adapt automatically to parameters of a fuel which is to be burnt in the combustion engine. In this context, the combustion engines of these modern vehicles can utilize, in particular different types of a classic liquid fuel (Super 95, 98, E, ethanol in the form which is currently widespread e.g. in South America, etc.) or a natural gas. A plurality of types of fuel within one class can be mixed with one another more or less well. In this context, such adaptation can ensure, for example, an operational capability of an internal combustion engine with different fuels.

The quality of various fuels is different even if they are sold, for example, under the designation "Super 95" (the number 95 is known to refer to the octane number). Considerable differences in quality can even occur within one standard. Both the standards of the types of fuel and their actual quality levels can change significantly during the life cycle of a motor vehicle, which can, of course, easily extend over 15 years or more.

In particular in the case of vehicles which can be driven by two or more types of energy, for example with types of spark-ignition fuel or with natural gas and/or with electrical energy, the user, e.g. driver of the vehicle, is usually over taxed or unnecessarily burdened with finding a respective advantageous, not to mention optimum, operating mode or type of energy.

At the same time, the values or value ranges of an optimum energy utilization or of an optimum energy supply of a vehicle shift over a wide range as a function of (in some cases very different) peripheral conditions which prevail during the energy utilization (and therefore during the driving mode of the vehicle). Even the basic values for optimum energy utilization are to a certain extent significantly dependent on the age and state of the respective vehicle and on the current use of the vehicle.

The object on which the invention is based is to provide a method, a corresponding device and a mobile user apparatus for adapting an energy supply of a drive system of at least one vehicle which permits improved efficiency, driving properties and/or exhaust gas emissions.

The object is achieved by means of a method for adapting an energy supply of a drive system of a vehicle, a corresponding device and a mobile user apparatus in accordance with embodiments of the invention.

The invention is characterized according to a first aspect by a method for adapting the energy supply of a drive system and according to a second aspect by a corresponding device for adapting the energy supply of a drive system of a vehicle.

Accordingly, values of at least a first energy utilization characteristic variable which represents a first energy utilization process in what is referred to as a first vehicle are determined, and values of at least one parameter which represents at least one peripheral condition of the energy utilization in said first vehicle during the first energy utilization process are determined. By this means, a mathematical relationship is then determined between at least one or more of the values of the at least one energy utilization characteristic variable and the corresponding values of the parameters of the at least one peripheral condition for the energy utilization, and a profile data record is made available which contains a data record and/or learning data on the basis of the at least one determined mathematical relationship. Subsequently, as a function of the profile data record which is made available, at least one adaptation information item for adapting the energy supply of a drive system of the (first) vehicle for a second energy utilization process is then determined and made available and/or an adaptation information item for adapting the energy supply of the drive system of another or second vehicle for an energy utilization process is determined and made available.

Within the scope of the method, adaptation can be carried out to a type of energy or types of fuel to be used at specific future or imminent times or time intervals and/or future or imminent route intervals of the respective vehicle as a function of the adaptation information item which is determined or made available for adapting the utilization of at least one type of energy for at least one drive system of the (for example) first vehicle and/or of a second vehicle. The adaptation to the types of energy and/or to the types of fuel can be carried out here by means of methods which are known per se or suitably adapted, for example in the case of spark-ignition fuels by changing the ignition angle in the combustion engine. However, the type or types of energy or type or types of fuel can themselves be adapted, for example in the case of fuel by adding additives or in the case of a vehicle with a hybrid drive, which can be operated both electrically and by means of a combustion engine, by changing the respective portion of the two types of drive in the total drive of the vehicle.

The adaptation information item can also refer to a (specific) type of energy and/or type of fuel on the basis of qualitative and/or quantitative values and represent their qualitative and quantitative values, e.g. 5 liters of diesel, in particular with specific fuel parameters and 125 kW/h electrical energy with respect to a second (planned) energy utilization process. The adaptation information item can represent here a (new) information item relating to a preferably optimized (or favorable as possible) utilization and/or supply of the at least one type of energy for the first and/or second vehicle for a second energy utilization process. The adaptation information item can, however, also represent a change with respect to a previous energy utilization, for example in a first energy utilization process and/or after previous planning or previous setting for the utilization or supply of the at least one type of energy. The (subsequent) adaptation of an energy supply of a drive system of the first vehicle and/or of a second vehicle can take place after a method which is known per se, is adapted or further developed.

According to the invention, different sources of electrical energy can also expressly be considered to be different types of energy. In particular, different types of energy can also be various energy stores which operate with different physical principles, such as for example a battery, a fuel cell, a short-term electrical energy store, for example a capacitor system (referred to as a "super capacitor") or else energy sources which have significantly different technical values or energy utilization characteristic variables. In particular, with the method according to the invention it is also possible to adapt energy utilization of the vehicle to an electrical charge from at least two different energy stores or energy sources.

A fuel can be considered to be, in particular, a diesel fuel, spark-ignition fuel, natural gas, hydrogen (for combustion or for utilization for energy acquisition in a fuel cell) as well as synthetic gases. Correspondingly, a container (e.g. high-pressure container) for storing a gaseous propellant can be considered in the method to be a fuel tank of the vehicle.

The profile data record can also preferably comprise, in addition to the determined mathematical relationship, further, e.g. general, parameters or applicable settings of the vehicle. This can include, for example, further, in particular, statistical data items relating to the first vehicle.

The adaptation of an energy supply of a driver system for the drive of a vehicle can also be configured in such a way that on the basis of the determined adaptation information item a user information item is generated which represents specific adaptation (e.g. switching or setting) of at least the utilization of at least one type of energy for the drive of the vehicle by an action of the user (e.g. an operator control action of the user). The adaptation of an energy supply of a drive system of the first vehicle and/or of a second vehicle during a second energy utilization process particularly preferably takes place in an at least partially automated fashion. In this context, the settings for the adaptation can be transferred, for example, automatically into the vehicle or made available in the latter. The adaptation information item or the changes which are dependent thereon in respect of the use of types of energy and/or types of fuel can then be confirmed with a simple (operator control) action by the user, in particular by the driver of the respective vehicle; if appropriate, the user can influence the adaptation information item in a suitable way. In the method according to the invention, a (quantitative) ratio of the types of energy and/or types of fuel used in a second energy utilization process is preferably adapted as a function of at least one profile data record which is made available.

A drive system can be understood to be, in particular, a traction drive system of the vehicle which serves to propel the vehicle. The energy supply of the drive system can relate here to feeding of energy to the vehicle from the outside, in particular from an energy supply point. This may be, in particular, an energy supply of at least one specific type of energy or one specific type of fuel and/or an (electrical) charge, for example in specific quantities. However, this also includes refueling with a specific type of fuel, as well as generally the formation of energy reserves within the vehicle, in particular of specific quantities of specific types of energy and/or types of fuel for energy supply to the drive system thereof, wherein energy reserves are intended, in particular, for specific routes and/or application cases of the vehicle. Furthermore, this includes feeding at least one type of energy to the drive system of the vehicle, for example from an energy store of the vehicle.

In particular, the supply of energy relates to feeding a specific type of fuel or fuel composition and/or electrical charge which is provided at least partially for the second energy utilization process, wherein the feeding is carried out by one or more refueling stations or charging stations, in particular in quantities which are predetermined according to the method according to the invention. The supply of energy can comprise here specific apportioning of the types of energy and/or fuel composition, in particular in combination with a respective quantity, for at least one drive system of the first vehicle and/or of the second vehicle for the second energy utilization process. The determined adaptation information item can be made available in the vehicle for one or more functions of the vehicle.

Depending on the adaptation information item it is possible e.g. also to output an information item for the user of the vehicle which relates, in particular, to an energy supply of the drive system.

The determined adaptation information item can comprise an optimization function and therefore bring about a fuel composition which is optimum or at least as favorable as possible and/or apportioning of various types of energy which is optimum or at least as favorable as possible for future or upcoming driving by means of the drive system of a vehicle, specifically what is referred to as the first vehicle and/or of another vehicle, referred to as a second vehicle, for a second energy utilization process.

With the method according to the invention it is therefore possible to adapt the energy supply of a drive system of the first or of a further (second) vehicle which is operated by a combustion engine and/or electric motor. In this context, a respectively optimized type of drive and/or operating mode can also be achieved as a function of the determined adaptation information item. In the method according to the invention, the adaptation information item can cause specific predefined values (what are referred to as target values) relating to the energy consumption of the vehicle and/or relating to vehicle movement dynamics properties of the vehicle to be taken into account.

An increase in the efficiency during the energy utilization can advantageously be achieved by means of the method and a contribution made to environmental protection, in particular through reduction or overall optimization of emissions, e.g. $CO_2$ and/or reduction in pollutants. This can take place when there is a constant or even increasing performance capability or driving dynamics of the vehicles.

The first and second energy utilization processes each relate, in particular, to an energy conversion process relating to drive energy which serves essentially to propel the vehicle. The first and second energy utilization processes each relate, in particular, to energy utilization within the drive system of a respective vehicle, in particular within a combustion engine and/or within the drive train and/or chassis of the respective vehicle. In this context, the respective vehicle can have one or more combustion engines. In addition, the respective and, in particular, what is referred to as the first, vehicle can have an electric drive and therefore be embodied as a hybrid vehicle. With respect to energy utilization by means of a combustion engine, instead of the term energy utilization it is also alternatively or additionally appropriately possible to use the term fuel utilization.

The values of the at least one energy utilization characteristic variable and the values of the at least one parameter are preferably determined as a function of a multiplicity of operating phases of the first vehicle, wherein the determination also comprises detection with a sensor device. In the method, an energy utilization characteristic variable can be determined which represents at least one or more, in particular statistically formed or cumulated, energy utilization characteristic variables. The energy utilization characteristic variable can relate here to at least one or more different phases of the first energy utilization process. The energy utilization characteristic variable can be a set of values or a data array with a multiplicity of parameters, that is to say for example for one or more phases of the energy utilization process.

The at least one parameter of the peripheral condition of the energy utilization characterizes at least one peripheral condition which has a certain relevance for the energy utilization, in particular with respect to the utilization of a specific type of energy, wherein the respective peripheral condition is or was present during the respective energy utilization process. The method according to the invention preferably takes into account a plurality of parameters which (each) represent at least one profile condition of the energy utilization with respect to the first vehicle and/or the combustion engine of the first vehicle and/or the environment of the first vehicle during the first energy utilization process.

The at least one parameter of the peripheral condition can represent a permanent or variable peripheral condition of the energy utilization with respect to the first vehicle and/or the combustion engine and/or the environment of the first vehicle. A permanent peripheral condition can be considered here to be a slowly variable peripheral condition of the energy utilization, for example a slightly variable driving profile or regular routes which have specific properties and are driven along with the vehicle. Variable peripheral conditions are considered to be conditions which vary somewhat more in the short term in terms of timing, that is to say, for example, an external temperature, an air pressure, an air humidity level or driving profiles or routes which are characterized by particular features.

As far as the mathematical relationship is concerned, said relationship can comprise a predefined mathematical law, rule, prescription and/or relation between one or more energy utilization characteristic variables and one or more of the specified parameters. The mathematical relationship can represent here coefficients relating to one or more, in particular, predetermined equations, polynomials or a simulation. This involves, in particular, a mathematical relationship which is constructed in an expedient fashion.

In a simplified example of the mathematical relationship, values of the at least one energy utilization characteristic variable can be assigned, stored and/or made available, for example, to the respective associated values of the at least one parameter of the peripheral conditions of the energy utilization. In particular, the respective numerical values which relate, in particular, to the same time intervals can be suitably assigned to one another. In this context, the mathematical relationship can be configured in such a way that a result of the mathematical relationship represents a dependence between two or more parameters (of the at least one peripheral condition of the energy utilization) and represents two or more corresponding energy utilization characteristic variables. The mathematical relationship particularly preferably represents a solution space of a multiplicity of the properties of the first vehicle with respect to one or more (specific) energy utilization processes. With the mathematical relationship one or more properties of the first vehicle can also preferably be described at least partially in a system-theoretical fashion, specifically as a relationship between the resulting input variables and output variables.

The data record which is made available can comprise here all of the characteristic variables, or those selected according to specific criteria, of the (predetermined) mathematical relationship. In particular, a selected data record can comprise a selection of the characteristic variables of the mathematical relationship which is optimized as a function of an application case. A mathematical relationship can be determined as learning data in relation to at least one or the plurality of values of the at least one energy supply characteristic variable and the corresponding values of the parameters of the peripheral conditions of the energy utilization. The learning data can also represent a difference or a deviation from a previous value and/or a standard value or average value. The learning data can also directly or indirectly represent a specific change in the data record, in particular in the form of an update information item relating to a data record which is made available or has been previously stored.

At least some of the values of the data record can preferably be determined as a function of a first energy utilization process, for example within a certain time interval, after which the learning data relating to a change in the data record in the first vehicle are made available. The profile data record which is made available can comprise here at least one data record and/or learning data on the basis of one or more determined mathematical relationships. In this context, a profile data record can comprise e.g. the data of the data record and/or learning data and a use specification for the data.

Expressed in simplified terms, the profile data record which is made available can represent a specific "wealth of experience" (corresponding to a data record) or a new "experience" or "updating of experience" (corresponding to learning data) of the first vehicle with respect to the energy utilization by the first vehicle under a multiplicity of different peripheral conditions.

The energy utilization of the, or generally of a, vehicle can be adapted by means of the determined profile data record taking into account these specific properties in such a way that one or more aspects of the energy utilization of a first vehicle and/or of a second vehicle are/is improved. Therefore, with the method according to the invention it is possible to react to a change, for example owing to aging, of specific properties of the vehicle or of its components, and also to changes within an entire series of vehicle models, if these properties change over time.

As far as the adaptation information item is concerned, it can comprise a multiplicity of specific adaptation measures and/or quantitative values for carrying out the measures. The adaptation information item for adapting the energy supply of a drive system can relate here in the method according to the invention to a fuel composition and/or proportioning of various available types of energy for the drive system of a vehicle with respect to a (second) energy utilization process. The adaptation information item relates in the method according to the invention to an adaptation, in particular control of the adaptation, of the energy supply of a drive system and also to feeding of the energy to the vehicle from the outside, in particular feeding of a specific fuel composition and/or the apportioning of types of energy for the second energy utilization process. In this context, energy can be fed to the vehicle from the outside as a function of the adaptation information item, in particular in order to supply specific types of energy and/or fuel compositions in specific quantities for a second energy utilization process. Alternatively or additionally, with the method according to the invention it is furthermore possible to change in a targeted fashion at least one setting of the vehicle and, in particular, of the drive system of the first vehicle or of the second vehicle for the second energy utilization process as a function of the adaptation information item for adapting energy utilization of a drive system of the first vehicle and/or of the second vehicle. For example, as a function of the adaptation information item, suitable control signals can be selectively generated, for example for continuous adaptation of the feeding of energy to the drive system for or during the second energy utilization process.

According to the method according to the invention, a profile data record or parts of the profile data record can be transmitted to a central device, for example to a back end of, for example, the energy supply point or of a vehicle manufacturer, where basically the favorable energy utilization variable can also be determined—preferably, however, the latter takes place in a computing unit in the vehicle. The profile data record in the method according to the invention can be completed and/or updated continuously or in an event-controlled fashion or at regular time intervals. In particular, an initial, previous or rarely updated profile data record can be updated at relatively frequent time intervals as a function of respective new learning data.

For example, a profile data record which has already been stored in a second vehicle can be updated as a function of transmitted learning data which have been determined as a function of the data of a first vehicle. This provides a particularly high level of efficiency and rapid and effective updating of the data on which the method is based. In this context, a profile data record can be transmitted with the learning data on the basis of the data of a first vehicle which comprise merely a change or update of a previous profile data record for a second vehicle, wherein only the affected part, specifically that which is to be changed, of the previous profile data record is subsequently updated.

As a result it can be ensured that resulting data records can be acquired from output data which represent a combination of a multiplicity of various permanent peripheral conditions of the energy utilization and/or variable peripheral conditions of the energy utilization and which can then be applied to a multiplicity of combinations, in particular new combinations of permanent and variable peripheral conditions which prevail (or can prevail) in a second energy utilization process. The values of the at least one energy utilization characteristic variable can be made available assigned to the respectively associated values at a predefined first data interface. The determined profile data record can be made available at a predefined second data interface. The first data interface and the second data interface can be embodied as one or two interfaces. A control device of the first vehicle can have the first data interface, and a mobile user apparatus can have the second data interface.

In particular, the profile data record can be determined at least partially by a mobile user apparatus. For example, the mobile user apparatus can be designed to determine, as a function of data, for example vehicle sensor data, which have been made available or selectively read out from the vehicle, the values of the at least one energy utilization characteristic variable and/or to detect and/or determine the values of the at least one parameter of the peripheral conditions of the energy utilization. Alternatively or additionally, the mobile user apparatus can be designed to transmit, receive and/or manage one or more profile data records.

The profile data record can therefore also be determined as a function of data of at least one vehicle sensor and/or as a function of user settings which can be predefined, in particular, by means of the mobile user apparatus. In this context, the user can change his settings by a human-machine interface of the first vehicle and/or by means of a mobile user apparatus, in particular by means of a human-machine interface of a mobile user apparatus which has already been specified.

As a function of the profile data record which has been made available it is possible to determine an adaptation information item, for example by means of a predefined computer program in a computer unit of the vehicle and/or in a mobile user apparatus. In this context, one or more predefined optimization criteria of the user of the vehicle can also be taken into account.

At least one profile data record can be determined in the method on the basis of values which are standardized and/or cleaned and/or related to a multiplicity of first vehicles. The profile data record or at least an adaptation information item can also be formed or changed by means of methods of statistical mathematics which are known per se. Therefore, what is referred to as a resulting profile data record is obtained, for example from an item of statistical information from a plurality of vehicles which are preferably of the same type and which are operated under different peripheral conditions. Therefore, an optimum or at least an as favorable as possible composition for a type of energy to be used by the drive system can be determined and set, in particular also with respect to peripheral conditions which are to be expected in the future.

A (selective) exchange of profile data records or of the adaptation information items which have been determined for various (first) vehicles can be carried out by means of a mobile user apparatus. In this context, these profile data records or adaptation information items can also be read in as required by other users, specifically for example with a corresponding app (=application) and used. The learning data and/or said data record can thus be received or selectively interrogated by a further mobile user apparatus of a user of a second vehicle.

If values of the at least one said parameter have not yet been determined, or not been determined to a sufficient degree, as is the case, for example, in a newly manufactured vehicle, values of the at least one parameter, which are suitable, as it were, for starting the method can also be acquired from a simulation or values of another vehicle can be used. In a simplified case, said values can be input and/or imported and corrected later by means of genuine measured values.

In one advantageous refinement, according to the first and second aspects, in each case one or more values of a fuel parameter are determined at least for two types of fuel which can be used to operate the combustion engine, and the profile data record is determined as a function of the respective value or the respective values of a fuel parameter (of the respective type of fuel). This has the advantage that the energy utilization characteristic variable can also be utilized for the respectively used fuel. The value or values of the at least one fuel parameter can each be determined after a refueling process and/or as a function of the data of one or more refueling processes. The at least one fuel parameter can be representative of portions of various types of fuel and/or of a mixing ratio of predefined fuel components in the vehicle fuel which is being respectively used at the current time and/or at a specific time. The value of the at least one fuel parameter can thus clarify a type of fuel itself and/or its octane number and/or a viscosity level and/or represent a portion of a fuel component. By means of the profile data record it is therefore possible, for example, to determine a change in the at least one fuel parameter which is suitable for approximating the determined energy utilization characteristic variable (in this case a fuel utilization characteristic variable) to a setpoint fuel utilization characteristic variable which is predefined or is to be aimed for. The setpoint fuel utilization characteristic variable can be a value for the fuel utilization characteristic variable (or generally energy utilization variable) which is optimized as far as possible.

In one advantageous refinement, the utilization of at least one type of energy for driving the first vehicle and/or a second vehicle during a second energy utilization process is adapted in such a way that a second energy utilization characteristic variable which is as favorable as possible and which represents a second energy utilization process in the vehicle is achieved. The adaptation information item can preferably be determined in such a way that one or more second energy utilization characteristic variables for a second energy utilization process are optimized in an adapted fashion (if appropriate taking into account further optimization criteria or optimization objectives).

Alternatively or additionally, the determined adaptation information item can serve for adapting (a multiplicity of) further parameters of an energy utilization process, in particular on the basis of further underlying optimization criteria. In particular, a (further, associated or subsequent) adaptation of the energy utilization characteristic variable can also take place after adaptation of the energy supply of a drive system of the first vehicle and/or a second vehicle for a (second or other or further) energy utilization process.

In the method according to the invention, a corresponding user information item can be issued to the user (e.g. driver of the vehicle) by means of an output as a function of the determined information item relating to the adaptation of the energy supply of the drive system of the first vehicle and/or of a second vehicle during a second energy utilization process.

In one advantageous refinement, the at least one parameter relating to the peripheral condition of the energy utilization is determined as a function of driving state data in the first vehicle during a first energy utilization process, wherein the driving state data are preferably determined as a function of the data or measured values of an environment sensor system of the first vehicle. The driving state data can be statistical and/or cumulated data which represent a statistical driving state in the first energy utilization process. For example, the driving state includes information as to whether the vehicle has been driving in the wind shadow of another (large) vehicle. In addition, the driving state can also include parameters of the route which explicitly or implicitly represent energy consumption.

Furthermore, there can be provision that what is referred to as an energy parameter of at least one type of energy which is or has been utilized by the first vehicle during a first energy utilization process is determined and a suitable reference is established between the determined energy parameter and the profile data record. In this context, one or more values of at least one (specific) energy parameter can be determined which represents energy which is utilized during the first energy utilization process in the first vehicle (in one or more time periods or sections of a route during the first energy utilization process). Depending on the type of energy, an energy parameter can be a fuel parameter or a parameter of an energy store for generating and/or storing electrical energy. An energy parameter of an energy store can also comprise characteristic numbers of a battery or values which are derived therefrom. An energy parameter can comprise e.g. characteristic variables, characteristic curves, characteristic fields etc. which characterize the behavior of the energy store during an energy utilization process. In this context, the energy parameters particularly preferably relate to a current state of an energy store, e.g. of a traction battery of an at least partially electrically driven vehicle. The corresponding energy parameters, for example in relation to a current state of a battery, can be determined here in the method, for example read in or estimated on the basis of the age and/or the charging cycles of the battery.

A determined first energy parameter can be here an actual variable of the energy parameter, e.g. of a fuel parameter, which has been used in a previous (first) fuel utilization. An energy parameter can be a fuel parameter which relates accordingly to a gas which can be utilized to acquire energy in the vehicle (natural gas, hydrogen, synthetic gases etc.). Examples of these are the octane number, the viscosity level or a temperature dependency. In this context, the profile data record can comprise a (mathematical) reference to one or more corresponding values of the at least one determined energy parameter.

The mathematical relationship between at least one or more of the values of the at least one energy utilization characteristic variable in the first vehicle and the corresponding values of the parameters of the multiplicity of information items of the first vehicle also preferably comprises a (predetermined, mathematical) reference to one or more corresponding values of the at least one determined energy parameter. The mathematical relationship particularly preferably connects at least one of the following combinations of the determined parameters: one or more of the values of the at least one energy utilization characteristic variable in the first vehicle and the corresponding values of the energy parameters during a first energy utilization process in the first vehicle, and/or one or more values of the parameters which represent a multiplicity of information items relating to (electronic) settings of the first vehicle during a first energy utilization process, and the corresponding values of the energy parameters during a first energy utilization process in the first vehicle. The mathematical relationship particularly preferably comprises a plurality of, in particular unambiguous and/or statistical, mathematical relationships, between the specified variables.

In a further advantageous refinement, in the method according to the invention at least one energy utilization characteristic variable which represents a first energy utilization process in a first vehicle and/or a second energy utilization characteristic variable which represents a second energy utilization process in a first vehicle and/or in a second vehicle represents one or more of the following values: a drive power and/or a torque of the drive assembly and/or emission data, in particular with respect to the exhaust gas of a combustion engine of the vehicle, and/or the data of a knocking sensor of the combustion engine and/or a value for an environmental efficiency and/or for an energy efficiency.

In this context, at least one energy utilization characteristic variable can represent a statistical relationship to the specified variables. For example, the emission values per route traveled or time interval can be represented. In addition, the energy utilization characteristic variable can also represent respective maximum, minimum, cumulated, average characteristic numbers or characteristic numbers related to further variables. For example, a value for environmental efficiency can be represented as a function of a plurality of predetermined coefficients, e.g. by means of a weighting of different types of emission. Particularly preferably, in the method at least one energy utilization characteristic variable is formed as a mathematical ratio of two or more characteristic variables which represent a result of the energy utilization process. For example, at least one energy utilization characteristic variable can express a ratio of the drive power achieved in the respective energy utilization process and/or effective drive energy with respect to the corresponding characteristic variables of emission data in the same time interval. Particularly preferably, at least one energy utilization characteristic variable can be determined as a cumulated value of an environmental efficiency and/or an energy efficiency level for the respective energy utilization process. For example, the at least one energy utilization characteristic variable can be characteristic of dynamic driving with high environmental efficiency.

In a further advantageous refinement of the method according to the invention, at least one vehicle-specific influencing variable of at least a first vehicle and/or one vehicle-specific influencing variable of the second vehicle can also be determined with respect to a second energy utilization process, and an adaptation information item can be implemented for adapting the energy supply of the drive system of the first vehicle and/or of a second vehicle during a second energy utilization process as a function of the determined vehicle-specific influencing variable of the first vehicle and/or of the determined vehicle-specific influencing variable of the second vehicle. In this context, the vehicle-specific influencing variable of the first or of the second vehicle can be at least one specific property which applies to the respective vehicle or the respective type of vehicle, in particular in relation to the energy utilization of the first or second vehicle. The vehicle-specific influencing variable preferably relates to an energy utilization process of a specific type of energy and/or a specific type of an energy utilization process and/or to specific parameters. In other words, at least one particularity (for example a particularity which is associated with the age or the mileage of the vehicle) of the first vehicle and/or of a second vehicle can be taken into account in the form of a vehicle-specific influencing variable in the method. Therefore, with the method according to the invention a further advantage is obtained, specifically that this method can be applied to a multiplicity of different vehicles with respect to the energy utilization.

In particular, the vehicle-specific influencing variable can comprise a deviation from a specific standard or standard values or average values and/or from properties in a new state of the vehicle. In particular, the influencing variable can also explicitly or implicitly represent a difference between the first and the second vehicle, in particular in relation to the energy utilization properties. A vehicle-specific influencing variable can already be determined here during a first energy utilization process and be made available altogether with the profile data record, in particular as a component of the profile data record or of the mathematical relationship. In this context, in the further method the properties of the specific first vehicle can also be taken into account, which supplies the mathematical relationship (for the further use). The mathematical relationship or the profile data record resulting therefrom can particularly preferably be cleaned of the vehicle-specific properties of the first vehicle, in particular of the standard deviations or average deviations. In this context, at least one profile data record which relates to average or standard values can be generated from one or more first vehicles. Such a profile data record can also be made available for adapting the energy supply of a multiplicity of the first vehicles and/or second vehicles for the second energy utilization process and correspondingly applied.

In particular, the vehicle-specific influencing variable relates to the first vehicle and/or the second vehicle. A first vehicle-specific influencing variable representing the first vehicle can be taken into account in the method, in particular in the mathematical relationship and/or during the adaptation of the energy supply in the first vehicle and/or in a second vehicle. A second vehicle-specific influencing variable representing a second vehicle can be taken into account in the method, in particular during the adaptation of the second energy utilization process in a second vehicle. The properties of both the first vehicle and of the second vehicle which are specific at least with respect to the energy utilization are particularly preferably taken into account. More precise adaptation, in particular optimization, is therefore made possible. In particular, the vehicle-specific influencing variable is representative of at least two different vehicle components. In particular, in the method two vehicle-specific influencing variables are taken into account which relate, in particular, to two different vehicle components. The vehicle-specific influencing variable can preferably be representative of two vehicle components which serve for the use of energy for driving the vehicle from respective different types of energy and/or types of fuel.

In a further advantageous refinement, at least one vehicle-specific influencing variable of a specific vehicle is representative of a state and/or a residual operational capacity of one or more vehicle components of the vehicle. In this context, the vehicle-specific influencing variable of a specific vehicle can be taken into account, in particular with respect to an influence of a state and/or a residual operational capacity of the respective vehicle component on the energy utilization in the method. The vehicle component can be a vehicle engine and/or a drive component and/or a catalytic converter and/or what is referred to as a consumption component which has to be frequently exchanged or refilled, such as, for example, a filter and/or a vehicle fluid such as an engine oil or a cooling fluid. It is possible to determine at least approximate values for the age, the degree of wear and/or residual service life or nominal residual power of one or more vehicle components.

In this context, a qualitative and/or quantitative information item or a corresponding conclusion about a change of a state and/or a degree of wear of the respective vehicle component and/or a residual operational capacity of at least one component as a result of the respective energy utilization can be determined as a function of the profile data record which is made available. The "state" can be here a "continuous state", in particular a physical or chemical state. In particular, the vehicle components are vehicle components which have a direct relation with an energy utilization process. In particular, these can be components of the combustion engine or generally of the drive and/or of actuators of the chassis of the vehicle. The change of a state and/or of a degree of wear of at least one vehicle component can also comprise determining or estimating their residual operational capacity. The residual operational capacity can relate, for example, to a driving distance (kilometers) and/or an absolute rotational speed and/or time units.

A change in a state and/or in a degree of wear as well as an estimation of the (residual) service life can be determined at least partially with means of the mobile user apparatus of the user (i.e. of the driver of the vehicle). In this context, profile data records and further data relating to a multiplicity of the vehicles can be read in with means of the mobile user apparatus. In this context, for example very efficient and precise predictions can be determined about the residual service life of specific vehicle components (of a specific vehicle or type of vehicle). Therefore, data relating to changes in a state and/or a degree of wear and/or an estimate of the (residual) service life can also be acquired for vehicles without corresponding acquisition of data, IT infrastructure, etc.

In a further advantageous refinement, the at least one vehicle-specific influencing variable of a specific vehicle is representative of a predefined or desired degree of reduction in wear and/or reduction in consumption and/or an increase in residual operational capacity of at least one vehicle component of the vehicle. In particular, the vehicle-specific influencing variable which is representative of a predefined degree of reduction in wear and/or reduction in consumption and/or a specific residual operational capacity or increase in residual operational capacity can be predefined or determined as a function of user settings (i.e. depending on what is to be optimized according to the user's request) and/or on the basis of an optimization calculation for a specific first vehicle or the second vehicle. In this context, the user can predefine, for example for different vehicle components, different predefined values for the reduction in wear to be achieved and/or a reduction in consumption and/or a specific residual operational capacity or increase in residual operational capacity and/or also select them from an overall context with further settings or groups of settings.

In a further advantageous refinement, in the method an assignment of at least two different types of energy and/or types of fuel to at least two (specific) time intervals and/or route intervals is determined or varied as a function of the profile data record which is made available. In this context, apportioning to at least two specific time intervals or specific route sections is particularly preferably determined. Specific time intervals or route sections can be time intervals or route sections which are characterized by specific properties, in particular ones which are understandable to the user. Time intervals can preferably be characterized by and in relation to a specific process, for example the refueling and/or recharging (of the battery) of a vehicle or the reaching of a specific location or a (specific) journey in the daytime or at dusk or in the night. Alternatively or additionally, the route sections can relate to specific boundaries, for example boundaries of localities or countries, a region within a locality or a region outside a locality. The time intervals and/or route sections can relate to a route which is determined with a navigation system of the vehicle, a possible or probable route, in particular at least what is referred to as a most probable route. The information items of a digital map of the respective surroundings can also be used here.

In a further advantageous refinement, in the method at least one adaptation information item for adapting the energy supply of a drive system of a first vehicle and/or of a second vehicle can be changed by a user of the second vehicle. In this context, an adaptation information item for adapting the energy supply of a drive system at least with respect to a minimum absorption quantity or a proportion of an absorption quantity of at least one of the types of energy of the first vehicle at an energy supply point can be representative of a restriction of types of fuel for the first vehicle and/or representative of an assignment of types of fuel for the first vehicle and/or with respect to a cumulated environmental characteristic variable. In this context, the user can directly or indirectly change the adaptation information item, determined as a function of at least one profile data record, for adapting the energy supply of a drive system of a first vehicle and/or of a second vehicle, for example by the operator control inputs of said user. In this context, relationships between the respective variables which relate to at least one energy parameter can be changed. In this context, during the adaptation of the energy supply of a drive system at least of a first and/or second vehicle a second energy parameter which is even more precise and improved in accordance with the driver's request for a second energy supply process can be determined. For example, the specific parameters can be limited or preferred.

In a further advantageous refinement, in the method according to the invention in each case the profile data record is determined and made available for a multiplicity of first vehicles and a resulting profile data record is determined as a function of at least some of the respective profile data records and made available. An adaptation information item for adapting the energy supply of a drive system of at least a second vehicle is then produced as a function of the resulting profile data record which is made available. The so-called resulting profile data record owing to the multiplicity of the first vehicles can then preferably be determined according to predetermined mathematical criteria. For example, the resulting profile data record can be determined by means of statistical characteristic variables, e.g. of average variables or limiting values which are formed from the multiplicity of the profiles of the multiplicity of the first vehicles.

In a further advantageous refinement, in the method according to the invention, as a function of an anticipated or predetermined use of a first vehicle and/or of a second vehicle, a profile data record or a resulting profile data record is assigned and/or adapted as a function of predefined similarity criteria, wherein the assignment of a profile data record is made, in particular, as a function of a predefined route section and/or a predefined type of route and/or the expected peripheral conditions of the energy utilization in a first vehicle or in a second vehicle during a second energy utilization process. In addition, an assigned profile data record can also be adapted, i.e. changed as a function of an anticipated or predetermined use of a first vehicle and/or of a second vehicle. The use of the vehicle can relate, for example, to a specific purpose of use of the vehicle, for example sporty driving, transportation of loads or careful transportation of people or goods. The use of the vehicle can be characterized here by characteristic values, in particular statistical and/or cumulated characteristic values and/or characteristic values relating to specific routes and/or application cases of the vehicle. In the method, at least one route-dependent optimization, in particular optimization of a scientific relationship between the energy parameter and the specific (planned or probable) route sections can be implemented.

In a further advantageous refinement according to the first and second aspects of the present invention, the respective profile data record is assigned to a predefined route section and/or a predefined type of route as a function of predefined similarity criteria. For this purpose, the respective profile data records, for example of various first vehicles, are preferably transmitted to a back end (that is to say a central server or computer which can be operated, for example, by the vehicle manufacturer). The assignment is made here, for example, by means of the back end or an Internet portal. This has the advantage that the profile data records can be varied on the basis of an input or planned route. In addition, at least one route-dependent information item, in particular a scientific relationship with fuels relating to a planned or probable imminent route can also be determined from a database or the back end.

In a further advantageous refinement, in the method according to the invention, a quantity of setting changes for at least one drive system of the first vehicle can be determined as a function of the profile data record which is made available, and the energy supply of a drive system of second vehicle for a second energy utilization process is adapted as a function of a predefined selection of the setting changes.

In a further advantageous refinement, an, in particular current composition, or a composition relating to a specific time, of a fuel in the fuel tank of the first vehicle can be determined, and, in order to supply energy for the second energy utilization process, portions of various types of fuel and/or a mixing ratio of predefined fuel components of the fuel to be refueled are determined as a function of the current composition of the fuel and the adaptation information item.

Furthermore, the energy utilization characteristic variable can be determined as a function of one or more variables which are representative of at least one exhaust gas characteristic variable and/or an actually attained torque characteristic curve and/or at least one detection variable of a knocking sensor of the combustion engine of the vehicle and/or one or more ignition angles and/or ignition times. In this context, the energy utilization characteristic variable can relate to the first vehicle and the first energy utilization process or the first or second energy utilization process of the first or second vehicle.

In a further advantageous refinement, the determined mathematical relationship also comprises a reference to at least one use parameter which represents at least one aspect of the use of the first vehicle during a first energy utilization process. In this context, one or more values of a use parameter relating to the corresponding values of the peripheral conditions of the energy utilization and the respectively corresponding values of the energy utilization characteristic variable can be offset against one another. In particular, a use parameter can be dependent on at least one information item relating to the use of at least one vehicle system of the first vehicle by the driver and/or an occupant during the first energy utilization process, for example according to one or more information items such as an information item relating to the use of at least one driver assistance system and/or an information item relating to the settings of a driver assistance system which is being used and/or at least one setting of the chassis of the vehicle and/or a use of heating functions or air-conditioning functions by at least one occupant of the vehicle. For example, a use parameter can represent at least one driving behavior of a driver and/or driving behavior of a vehicle function for at least partially automated driving, in particular with respect to the energy consumption.

The at least one use parameter can preferably contain a plurality of characteristic values which represent consumption of one or more types of energy. The at least one use parameter can also represent an explicit or implicit reference to the energy consumption of one or more types of energy. Such characteristic values of the use parameter can represent statistical values, for example average values, minimum values, maximum values and/or these can represent a specific profile of the use, for example a sequence of actions. The at least one use parameter particularly preferably relates to at least one specific behavior pattern of a driver and/or of a further occupant of the vehicle which are specific to certain energy consumption patterns, in particular relating to the energy of a specific type.

The at least one use parameter can therefore represent a multiplicity of the information items relating to the use of the first vehicle during the first energy utilization process, in particular a driving behavior with which the vehicle is driven by the driver and/or in an at least partially automated fashion. For example, the use parameter can represent a braking behavior and/or acceleration behavior and/or cornering behavior with which the first vehicle is or was driven during the first energy utilization process. In particular, the use parameter of the first vehicle can represent one or more (appropriately corresponding) statistical relationships to the use of the first vehicle.

Basically, one or more operating parameters of a driver assistance system of the vehicle can serve as a use parameter. In this context, at least one use parameter can represent one or more operating parameters (e.g. states or modes during the operation of a driver assistance system) of the first vehicle. This preferably involves a driver assistance system for assisting longitudinal guidance and/or transverse guidance of the vehicle or for at least partially automated driving. Such driver assistance systems can take into account a multiplicity of the data from the vehicle's surrounding sensing system (by means of sensors) and/or map data and/or back end data. Such driver assistance systems can also comprise a multiplicity of operating modes, settings, alternately usable logics etc. which can be used or applied actively during a journey. In the method according to the invention, a use parameter can be determined as a function of these data, in particular as a cumulated and/or standardized value.

The at least one use parameter can preferably represent an information item relating to the use of a driver assistance system by the driver, in particular during the first energy utilization process. During a subsequent adaptation of the second energy utilization process, one or more parameters or states of the driver assistance system which are then valid can then be taken into account as a peripheral condition relating to optimization of the at least one operating parameter in the first vehicle or in the second vehicle.

In particular, a use parameter can represent at least one information item relating to the use of the first vehicle during the first energy utilization process, in particular according to one or more following information items such as a driving statistic of the first vehicle and/or a vehicle setting which significantly influences a driving mode of the first vehicle and/or at least one pre-calculated route for the first vehicle and/or calendar data of a user of the first vehicle and/or a use of the first vehicle for a specific purpose. In this context, the use parameter can relate directly to the use of the driving function of the vehicle.

In this context, determining, storing and applying the data for the apportioning of types of energy for an energy conversion system of the first vehicle can be carried out as a particularly efficiently achievable "use-related", in particular "route-related", energy utilization plan. At the same time, the data relating to the apportioning of these types of energy can supply an input for a partially automatically produced logbook, an individual statistic or fleet statistic, for example for further optimization or to be made available.

The determination, in particular reading in, of the profile data record can basically be as a targeted search or a selection of a (best possible) suitable profile data record from a multiplicity of stored profile data records. The determination, in particular reading in, of the profile data record for the second vehicle can be carried out with means of the vehicle, e.g. by means of a transceiver unit of the vehicle, with or without a server functionality and/or a client functionality. The determination, in particular reading in, of the profile data record for the second vehicle can alternatively or additionally be carried out by means of a mobile user apparatus which is carried along in the second vehicle or assigned to the user of the second vehicle. One or more adaptation information items for adapting the energy supply of a drive system of the second vehicle can be determined here as a function of the determined profile data record at least partially with means of a mobile user apparatus of the user of the second vehicle. For example, a fuel parameter for two types of fuel which can be used for the operation of the combustion engine can be determined, and the energy supply of at least one drive system of the second vehicle can be adapted as a function of the determined adaptation information items.

The invention is distinguished according to a second aspect as a device for adapting an energy supply of a drive system of at least one vehicle, which device is configured to determine values of at least a first energy utilization characteristic variable which represents a first energy utilization process in a first vehicle, and values of at least one parameter which represents at least one peripheral condition of the energy utilization in the first vehicle during the first energy utilization process, and to establish a mathematical relationship between at least one or more values of at least one energy utilization characteristic variable and the corresponding values of at least one parameter, wherein the energy utilization characteristic variable represents a first energy utilization process in a first vehicle, and the at least one parameter represents at least one peripheral condition of the energy utilization in the first vehicle during the first energy utilization process. In addition, the device is configured to make available a profile data record comprising a data record and/or learning data on the basis of the at least one determined mathematical relationship, and is also configured to determine an adaptation information item for adapting the energy supply of a drive system of a first vehicle and/or of a second vehicle as a function of at least one profile data record for a second energy utilization process.

In a further advantageous refinement, the device is designed to carry out at least one further step of the method which is additionally described above or below. An information item relating to an improvement of specific parameters of the vehicle components can also advantageously be derived as a function of one or more profile data records, which can in turn also be considered to be a possible method feature. In particular, the quality of the vehicle components during development or production can be selectively and efficiently improved here as a function of the determined data. Valuable data and/or information which relates directly or indirectly to supplier's products or third-party products can also be acquired in order to improve specific vehicle components. For example, weak points of vehicle components can be detected easily and/or unambiguously and be evaluated to the advantage of the consumer or of the vehicle manufacturer.

In addition, a method according to the invention can also comprise means for automatically preventing incorrect refueling (for example diesel/gasoline) or can be combined with such a means. In this context, for example when refueling has been carried out, or ideally is only intended, an information item or warning can be output by a refueling station fuel dispenser and/or a supply of fuel can be prevented or interrupted, as a function of the determined values of an adaptation information item.

In the method according to the invention a mixing ratio between at least two types of energy and/or types of fuel can preferably be determined, and this determined result can be fed to the at least one drive system of the second vehicle. This may also relate to a feeding of types of energy and/or types of fuel with respect to specific route sections and/or time intervals. In particular, the energy supply of at least one drive system of the second vehicle can be carried out in a variable fashion over time, in particular continuously or in small increments.

The transmission, reception or exchange of data and information items and the aggregation of the respective profile data records which is provided within the scope of the method according to the invention can preferably be carried out at least partially by means of at least one mobile user apparatus which is configured for this purpose. In this context, targeted exchange of optimization information items between two or more users can also take place. As a result, these data which are intended for exchange can also be configured to be extremely compact and, where necessary, absolutely non-critical in terms of data protection technology. The exchange can take place, for example, via a Cloud network or Internet portal or Bluetooth.

In a further advantageous refinement, a set of setting changes for the energy utilization of the first vehicle is determined as a function of the profile data record which is made available of the first vehicle, and the fuel composition and/or the apportioning of types of energy for the drive system of the first vehicle for the second energy utilization process is determined as a function of a predefined selection of the setting changes.

A selection of the adaptation measures can be made by a predefined operator control action by means of an input device. In this context, a transfer or a change of settings can be displayed to the user, in particular graphically, on a display device of the (second) vehicle and/or of the mobile user apparatus. The setting changes which are predetermined for the first vehicle and/or an anticipated result of the setting change can also be displayed. The setting changes can also be selected and/or changed individually or jointly by the user here. It is therefore possible to display, in particular graphically, to the user of the second vehicle what is changing in his motor vehicle and, if appropriate, how and on what the setting changes will have effects. He can then freely decide jointly or selectively also to carry out, for example, a combination of two or more decisions, for example by selecting and/or shifting a selector slider.

In a further advantageous refinement according to the first and second aspects, a current composition of a fuel in the fuel tank of the first vehicle is determined. For subsequent refueling, which takes place as preparation for a future fuel utilization phase, portions of various types of fuel and/or a mixing ratio of predefined fuel components of the fuel to be refueled are determined as a function of the current composition of the fuel and the determined fuel composition.

For example, in the method, it can be determined what partial quantity of which type of fuel is to be refueled, and this partial quantity can be determined and communicated, and/or implemented, for example by means of a computer product in the form of an application software, with the result that the respective partial quantities in the fuel tank of the vehicle are mixed to form an optimum mixture. Adapted additions to the mixture or mixture conditions are preferably also determined and/or called. These can also be implemented by the energy supply point and/or by the user on the basis of the information item generated in the method. In particular, an optimized fuel composition can also be determined within a type of energy. This fuel composition can relate, in particular, to components with different octane numbers and/or ethanol components (and respectively related types) and/or methyl tert-butyl ether (MTBE) and/or ethyl tert-butyl ether (ETBE) and/or lubricants and additives and/or exhaust-gas-reducing reagents and/or other reagents or additives. In this context, the profile data record can comprise one or more scientifically expressed characteristic curve groups which comprise one or more optimized parameters or parameter relationships for the optimized fuel as a function of the abovementioned criteria, in particular also with respect to the external conditions.

The method according to the invention therefore also comprises in this relationship a controller of a device of a refueling station for changing the abovementioned characteristic values as a function of the determined adaptation information item. A virtually infinitely variable control (or control in small increments) for the fuel composition to be output is preferably provided. In this method, the portions of MTBE and/or ETBE (methyl tert-butyl ether or ethyl tert-butyl ether) in the fuel which is output can preferably be varied as a function of a profile data record which is made available. The demand for these substances by different vehicles is different under different peripheral conditions. Therefore, a large environmental benefit and cost benefit can be achieved. In particular, in the method at least one mixing ratio or an addition of specific fuel components to a mixture can be at least partially optimized as a function of a profile data record which is made available, if, for example, types of fuel which are stored in a fuel tank or in at least two fuel tanks (generally containers) of the vehicle are combined or mixed with one another.

However, in the method according to the invention an apportioning between the types of energy of an energy supply of a drive system of the at least one first vehicle and/or a second vehicle during the second energy utilization process can be adapted between different types of energy, such as for example between gas fuel and gasoline fuel or diesel fuel, or between electric charging and gasoline fuel or diesel fuel or between natural gas and electrical charging, as a function of the determined adaptation information item. In this context, adaptation can occur with respect to the quantities of the respective types of energy or types of fuel and/or respective energy parameters, e.g. fuel parameters.

A significant advantage of the method according to the invention is that the energy utilization, in particular the fuel utilization, for example the wear and/or consumption of vehicle components of vehicles, can be adapted during a lifecycle of the vehicles. However, adaptation to changed fuel standards and/or new types of fuel is also possible. It is particularly advantageous that for this, where appropriate, no, or merely a small degree of, hardware adaptation of the vehicle is necessary to execute the method, which permits rapid introduction into the market. The method for adapting the energy utilization can also be used without retrofitting of hardware in vehicles which are already in series production. The advantages of the method can therefore also be rolled out in vehicles which are already in series production (without retrofitting of hardware).

A part of the invention is also the application of the method according to the invention and a device which is suitable for this within a refueling station for the energy supply of vehicles which generates fuel ratios which can be mixed in an essentially infinitely variable fashion or in fine increments in accordance with an adaptation information item which is transmitted in wireless fashion.

According to a third aspect, the invention relates to a mobile user apparatus which is configured to carry out the method according to the first aspect of the invention together with at least one vehicle and/or together with a computing unit which is spaced apart from the vehicle. The mobile user apparatus can be, within the scope of this description, a smartphone, a tablet, a smartwatch, a piece of clothing with a suitable electronic device, a motorbike helmet with a human-machine interface, data glasses for the user, an external vehicle computer which can be carried along with the vehicle, an external navigation apparatus or an appropriate development of such things. The mobile user apparatus is designed here to execute at least some of the steps of the method for adapting an energy utilization process of a vehicle according to the first aspect. Advantageous refinements of the first aspect also apply here to the third aspect. In particular, the mobile user apparatus can be designed to transmit the profile data record and/or the determined fuel composition or the determined apportioning of the types of energy to the energy output point. The mobile user apparatus can for this purpose have a wire-bound or wireless interface. A transmitter part and/or a sensor system and/or computing resources and/or a transceiver unit and/or authentication methods of the mobile user apparatus can therefore be used in the method or also used in the method with other components. In addition, the mobile user apparatus can be designed to make available a data record and/or learning data on the basis of the at least one determined mathematical relationship and make available a profile data record which represents the learning data and/or the data record and values of at least one parameter with respect to a current or predicted peripheral condition of a second energy utilization process of the (first or second) vehicle. The mobile user apparatus can expressly be designed to determine, as a function of the profile data record and at least one predefined criterion, a fuel composition and/or apportioning of types of energy for a drive system of the first vehicle for a second energy utilization process.

The mobile user apparatus can preferably be designed to call at least one fuel component from an energy supply point (for example energy refueling point) in a specific quantity which generates, alone or together with a current content of at least one fuel tank of the vehicle, a specific fuel composition and/or apportioning of types of energy in the vehicle. Transmission of a prespecified value for a respective output quantity of the various types of energy and/or the respective types of fuel and/or the fuel composition to an energy supply point preferably takes place as a function of the determined fuel composition and/or the apportioning of types of energy for the drive system of the first vehicle for the second energy utilization process. The energy supply point can comprise a refueling point and/or an electric charging station. Various types of energy (electrical charge and/or gasoline and/or diesel fuel and/or natural gas and/or hydrogen) can therefore be absorbed by a vehicle at the energy supply point. The determined prespecified quantities can be transmitted to the energy supply point, with the result that the energy supply point can adapt its output quantities. The transmission can be configured here, in particular, by reading in the information items with at least one reading device or sensor of the energy supply point and/or by means of the or a mobile user apparatus. For example, an RFID chip which is mounted in the vicinity of the fuel tank filler flap (in the vehicle bodywork) can be read off. Said RFID chip can in turn be written to or configured very easily with the smartphone.

In this context, the results of an adaptation information item, in particular of an optimization calculation or only the necessary information items for reading in to an optimization formula) can be transmitted directly or indirectly to an energy supply point and cause types of energy or fuel compositions to be output there in a way which is dependent on the determined optimum. The output quantities can be suitably "dimensioned" as a function of the data transmitted on the basis of the profile data record which is made available, with the result that, for example, a pump of the energy supply point stops pumping precisely at the correct time or times and/or the charging station including charging characteristic curves is suitably controlled. Alternatively or additionally, a display which displays the respective optimum output quantities or the quantities which are still to be output can be provided on a display unit of the energy supply point.

The invention also comprises a computer program, in particular a computer program product comprising the computer program, wherein the computer program is designed to execute, on a data processing device of the vehicle or of the mobile user apparatus, a part of the method according to the invention or an advantageous refinement of the method according to one or more further features of the method during its execution. In particular, the computer program is a software program which can be run, for example, as an app (=application) for one or more types of mobile user apparatuses. This can preferably be a brand-specific software program, in particular also configured for handling customer data, user data or billing data.

The computer product can be embodied as a computer program product which comprises executable program code, wherein the program code, when executed by a data processing device, executes at least part of the method according to the first aspect or an advantageous refinement of the method according to the first aspect. The computer program product comprises, in particular, a medium which can be read by the data processing device and on which the program code is stored. The computer program product also preferably comprises an authorized access right to stored data of the computer program product or of the computer program. In particular, the computer product can be configured to execute at least part of the method which runs on a data processing device of the vehicle or can be configured to execute at least part of the method which runs on the data processing device of the mobile user apparatus.

Wherever the term vehicle is used here, the reference is to a multi-track motor vehicle or even to a motorcycle. This results in a plurality of advantages which are explicitly described within the scope of this document and a plurality of further advantages which can be understood by a person skilled in the art. A particularly large advantage is the application to a vehicle fleet (multiplicity of first vehicles and/or multiplicity of second vehicles), for example associated with one or more, for example cooperating, brands or members of an organization or of a group of a social network under a multiplicity of peripheral conditions. The vehicle can alternatively be an aircraft or a watercraft, wherein the method is applied appropriately to aircraft or watercraft.

Other objects, advantages and novel features of the present invention will become apparent from the following detailed description of one or more preferred embodiments when considered in conjunction with the accompanying drawing.

BRIEF DESCRIPTION OF THE DRAWING

The appended single

DETAILED DESCRIPTION OF THE DRAWING

Figure 1:
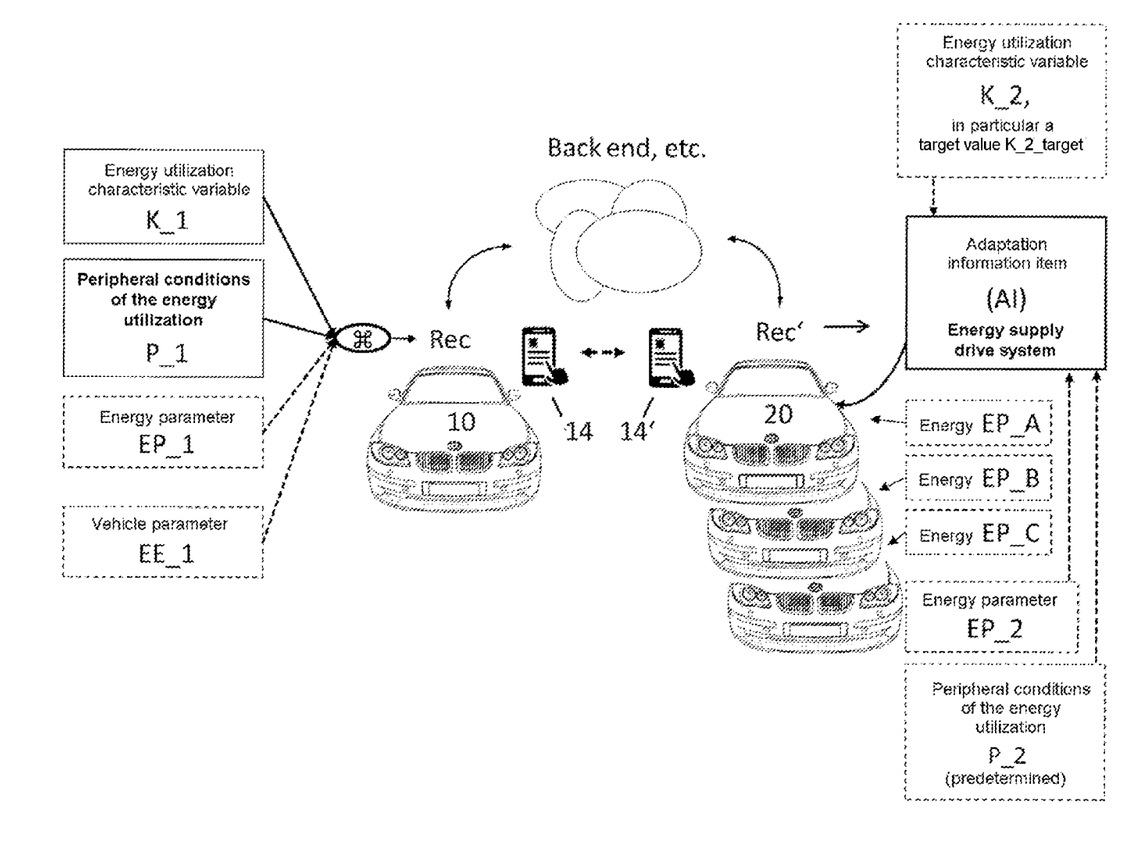
FIG. 1 shows an exemplary functional block diagram for a system according to an embodiment of the invention for controlling the energy supply of a vehicle.

Referring to FIG. 1, the system comprises at least a first vehicle 10. The first vehicle 10 has, for example, a combustion engine as a drive assembly. Alternatively or additionally, the first vehicle 10 can have an electric drive. The first vehicle 10 has a first control device. The system (or the device which is shown) optionally has at least one mobile user apparatus 14 which can be used by a respective user of the first vehicle 10 to control the energy supply of the first vehicle 10. The first mobile user apparatus 14 can be, for example, a smartphone, a tablet PC and/or a plug-in navigation apparatus.

The first control device (or a computing unit of said device) is designed to acquire and/or determine values of at least one energy utilization characteristic variable $K\_1$ which represents a first energy utilization process in the first vehicle. The energy utilization characteristic variables can also be referred to as first influencing variables which each represent a specific energy utilization property of a specific vehicle or of a specific type of vehicle.

In addition, the first control device is designed to acquire and/or determine values of at least one parameter $P\_1$ which represents at least one peripheral condition of the energy utilization in the first vehicle 10 during the first energy utilization process. The first control device is designed to store the values of the at least one energy utilization characteristic variable $K\_1$ in assignment to the respectively associated values of the at least one parameter $P\_1$ and make them available at a first data interface (referred to as "back end").

The first mobile user apparatus 14 is designed to determine a mathematical relationship between at least the one or more values which are made available of the at least one energy utilization characteristic variable $K\_1$ and the corresponding values of the parameters $P\_1$ and to make available a data record and/or learning data on the basis of the at least one determined mathematical relationship.

In addition, the first mobile user apparatus 14 is configured to determine values of at least one optional second or further parameter which represents a current or predicted peripheral condition of a second energy utilization process of the first vehicle and to make available a profile data record which comprises the learning data and/or the data record and the values of the at least one second parameter. This second or further parameter is, according to the appended FIGURE, an optional energy parameter $EP\_1$ (also referred to as a fuel parameter in the case of fuel as an energy carrier) and/or what is referred to as a vehicle parameter $EE\_1$.

According to the invention, a fuel composition and/or apportioning of types of energy for a drive system of the first vehicle for a second energy utilization process is determined as a function of the profile data record of the first vehicle and at least one predefined criterion. The second or further parameters which are specified above can also be referred to as second influencing variables which represent a current or predicted peripheral condition or factor of the second energy utilization process of the first vehicle.

Therefore, the second or further parameters can be determined, for example, from navigation data, from weather data and/or calendar data. The energy utilization characteristic variables K can be determined from the vehicle service data, workshop data and/or from the vehicle on-board power system. The values of the at least one second parameter can also be determined, for example, as a function of at least one predefined route attribute of a route section which is traveled along or is to be traveled along and/or as a function of travel times of the first vehicle or of a second vehicle 20. In particular, in this way a type of energy supply of the first vehicle 10 can be adapted as a function of the at least one predefined route attribute of the route section which is being traveled on or is to be traveled on and/or as a function of the travel times. For example, during the adaptation of the energy utilization it is taken into account whether the journey takes place during the daytime or at night. In addition, it is possible to take into account specific target values for noise nuisance, $CO_2$ emissions, fine dust emissions, etc. on specific route sections. It is therefore also possible to take into account an information item about the environmental zones of specific route sections. For example, an environmental zone with means of the first vehicle 10 or of a second vehicle 20 can be determined and subsequently the ideal portion of a specific type of energy which is suitable for the respective route sections can be determined. In particular, in this context the route sections with specific environmental zones can be determined from a navigation map, from the back end and/or by means of a traffic sign recognition system, for example also with a camera. Subsequently, the optimized portions of the types of energy can be determined and/or the first vehicle 10 can then correspondingly switch over thereto when traveling along the route.

The values of the at least one second parameter can, however, also be determined as a function of a driving statistic of the first vehicle and/or of a vehicle setting relating to a driving mode of the first vehicle and/or at least one precalculated route for the first vehicle and/or a predicted external temperature and/or current exhaust gas data of the first vehicle and/or data of a knocking sensor of the combustion engine of the first vehicle and/or calendar data of a user of the first vehicle and/or driver settings of the first vehicle 10 or of the second vehicle 20. There can be further dependencies for use of the first vehicle or of the second vehicle 20 for a specific purpose.

The driving statistic can comprise, for example, a route length statistic and/or speed statistic and/or an altitude profile statistic (mountainous/flat) and/or traffic density statistic (urban/rural). The vehicle settings e.g. "comfort", "sporty", "normal", can be determined on the basis of settings of a driving experience switch which are being used currently and/or have been used in the past. The at least one precalculated route can comprise a determined most probable route of the vehicle 10, 20. The current exhaust gas data can be determined, for example, by means of a regulated catalytic converter of the vehicle. The driver settings can also include direct user settings and/or (current or predicted) wishes of the user which are recognized with means of the vehicle or of the mobile user apparatus. The use for the specific purpose can be, for example, an instance of rescue deployment.

For the determination of the values of the at least one second parameter, for example the mobile user apparatus 14 can be designed to call the corresponding data from the first vehicle 10 from a predefined software application (also referred to as an app) from specially administered data records or from the internet via a wireless interface and offset these corresponding to predefined special or specific scientific relationships. In this context, values for the outputting of energy, which are optimum for an energy supply process, can be displayed, read out and/or transmitted directly or indirectly to the energy supply point. In the case of hire vehicles, calendar data or planning of one or more subsequent users and/or data of the subsequent user or users of the type described above can preferably be taken into account.

A profile data record Rec which is formed from the energy utilization characteristic variables K_1 and the parameter or parameters P_1, EP_1, EE_1 comprises, for example, predefined calculation formulas for determining an optimized fuel composition and/or optimized apportioning of the types of fuel and/or types of energy. In particular, the calculation formulas can be adapted as a function of the learning data. The profile data record Rec is determined and made available, in particular, as a function of the data record and/or the learning data which are made available on the basis of the at least one determined mathematical relationship. The mathematical relationship is determined, in particular, between at least one or more of the values which are made available of the at least one energy utilization characteristic variable and the corresponding values of the parameters.

The profile data record can optionally comprise energy prespecification data which can be changed by a user of the first vehicle and which are representative of a minimum absorption quantity of at least one of the types of energy of the first vehicle at an energy supply point and/or representative of a limitation of types of fuel for the first vehicle and/or representative of an assignment of types of fuel to the first vehicle. In particular, in this way incorrect refueling (for example diesel/gasoline) can also be prevented automatically. In this context, for example an information item or warning can be output and/or feeding of fuel can be prevented or interrupted as a function of the determined values of the at least one second parameter and an information item about a refueling which has taken place or which is intended (from the fuel dispenser). In this context, the at least one second parameter can also comprise, for example, the limiting values for the octane number, for example from 94-96 or from 91 to 96, which are dependent on a specific vehicle. In this context, the at least one second parameter can also comprise, for example, basic values for a "mixture which can be freely composed", also within one type of fuel. In this context, the user can also determine the factors on which his optimum energy mix depends to a greater or lesser extent, for example also the desired consideration of the environment.

A prespecified value for a respective output quantity of the types of energy and/or the respective types of fuel and/or the fuel composition is preferably transmitted to an energy supply point as a function of the determined fuel composition and/or the apportioning of types of energy for the drive system of the first vehicle 10 for a second energy utilization process. The energy supply point is determined here, for example, as a function of a position of the first vehicle. The position of the vehicle can be determined, for example, by means of a global positioning system (GPS).

The apportioning, as described above, of the functions of the first control device and of the first mobile user apparatus 14 is exemplary and can also occur in different ways. Further variants are, for example, that the profile data record Rec is determined with means of the first vehicle 10, in particular also as a function of the data of the first mobile user apparatus 14, and the profile data record Rec or information which is dependent thereon is transmitted to a stationary memory unit or computing unit, e.g. a Cloud, back end (as shown), or Internet portal.

The FIGURE also illustrates a multiplicity of second vehicles 20 which use data of the first vehicle 10 (or of the plurality of first vehicles 10), specifically relating to said profile data record Rec which is designated by Rec' for the second vehicles 20. This profile data record Rec' is fed to said second vehicles 20 here via the respective second mobile user apparatus 14'. In the respective second vehicle 20, an adaptation information item AI for the energy supply of the drive system of the respective second vehicle 20 can be acquired from an energy utilization characteristic variable K_2 which is acquired in said second vehicle 20 and can also be, in particular, a target value K_2 target. The drive system of said second vehicle 20 can be operated with various types of energy such as EP_A, EP_B, EP_C. During the determination of the adaptation information item, peripheral conditions of the energy utilization P_2 (as it were as an analog of the peripheral conditions of the energy utilization P_1 of the first vehicle) are also determined in addition to an energy parameter EP_2, which reflects, for example, the current fuel tank content of a vehicle 20. The profile data record Rec' is therefore adapted to the respective second vehicle 20.

Even if an adaptation information item AI is illustrated only for second vehicles 20 in this FIGURE, such an adaptation information item can, of course, also be made available for the first vehicle 10, specifically for a second energy utilization process, after the profile data record Rec has, of course, been acquired from a first energy utilization process.

A possible flowchart of a program for adapting an energy utilization process of a vehicle for the first mobile user apparatus is briefly described below.

The program is started in a first step. In a subsequent step, values of at least one, preferably of a plurality of, predefined energy utilization characteristic variables (K_1) which represent energy utilization in a first vehicle (10) are read in. In each case associated values of at least one, preferably of a plurality of, prespecified parameters (P_1, EP_1, EE_1), which represent a peripheral condition or factor of the first energy utilization process, are read in and/or stored in assignment to the values of the energy utilization characteristic variables. The peripheral condition or factor relates, for example, to the first vehicle and/or its combustion engine and/or an electric drive and/or the surroundings of the first vehicle. The respective energy utilization characteristic variables are made available by a first control unit of the first vehicle (10).

The at least one energy utilization characteristic variable is representative, for example, of at least one exhaust gas characteristic variable and/or an actually attained torque characteristic curve and/or of at least one detection variable of a knocking sensor of the combustion engine of the first vehicle and/or of one or more ignition angles and/or ignition times.

An exhaust gas characteristic variable as mentioned above can comprise data from a regulated catalytic converter of the first vehicle and/or the data of the regulated catalytic converter in combination with further data of the first vehicle or of the first mobile user apparatus 14. In particular, the at least one exhaust gas characteristic variable is suitable for describing properties of the exhaust gas of the first vehicle. The actually attained torque characteristic curve can be dependent on feeding a fuel supply, in particular with respect to different operating modes of the drive system of the first vehicle. A torque characteristic curve is preferably stored assigned to these parameters.

These energy utilization characteristic variables can preferably be acquired with means within the first vehicle 10 and/or from the data acquired with means of the first vehicle, for example with a computing unit of the first vehicle 10 or with the first mobile user apparatus 14, e.g. via an interface similar to an on-board diagnostic interface. The determined energy utilization characteristic variables can be both scientifically expressed sequences or time functions etc. as well as relationships, expressed scientifically, e.g. as a formula or formula coefficients, between two or more characteristic variables or one or more characteristic variables and as a function of one or more parameters which respectively represent a factor of the energy utilization or peripheral condition of the energy utilization. With respect to the data of the knocking sensor, ignition angle or ignition times, statistical data and/or dependency data and/or correlation data can also be collected, read out and used. What is referred to as the OBD (on-board diagnosis) interface is also appropriate for this.

The values of said parameters can be made available, for example, by the first vehicle by means of the navigation device and/or the first control device and/or the on-board computer of the first vehicle. Alternatively or additionally, the values of the parameters can be made available, for example, by second vehicle-external devices, for example a back end of the vehicle manufacturer. Alternatively or additionally, the values of said parameters can be made available by the mobile user apparatus 14 itself.

In a subsequent program step, the data record and/or the learning data are determined and the profile data record Rec, which takes into account the data record and/or the learning data and the values of the at least one second parameter, is made available. The data record or the learning data for the first vehicle are determined as a function of at least some of the values which are stored or made available of the at least one energy utilization characteristic variable and its associated values. In particular, coefficients are determined for the profile data record (Rec) on the basis of a predefined mathematical relationship which represents, for example, predefined equations, polynomials or simulations.

The data which are read in from the first vehicle or determined in the first vehicle and which are read out with the first mobile user apparatus 14, for example the smartphone of the user, for example via the on-board diagnosis interface or WLAN etc. can be used together with further data to determine the profile data record (Rec) with application software and then to distribute said profile data record Rec as appropriate. The profile data record Rec and, in particular, the learning data, are determined together with the parameters of the energy utilization, which characterize the peripheral conditions and can also be acquired at least partially with the first mobile user apparatus 14, and/or can be conditioned by the first mobile user apparatus 14.

Optionally, in the program step which has just been explained a resulting program data record Rec can be determined in that a resulting profile data record is determined as a function of a plurality of profile data records which have been determined and made available by a multiplicity of first vehicles.

The profile data record Rec can for this purpose be, for example, fused and/or aggregated with earlier profile data records by means of a software application and/or transmitted by means of a customer portal, Cloud, or back end. Subsequently, the profile data records of the large number of first vehicles are used by other uses or vehicles, specifically what are referred to here as the second vehicles.

In this case, the first vehicles are preferably each of the same type or of related type. The respective profile data records may have been determined here by taking into account an identical or different peripheral condition. This has the advantage that the profile data records can be much more precise and comprehensive. The learning data which have been determined in the first vehicles by means of the large number of energy utilization phases under different peripheral conditions are aggregated with one another, for example offset against one another with a specific target.

In a subsequent program step, for example the fuel composition, in particular the optimum fuel composition and/or preferably apportioning of types of energy for the combustion engine and/or the electric drive which is as favorable as possible are determined. It may be provided, for example, that a user predefines, by means of a predefined operator control device of the first vehicle and/or of the first mobile user apparatus 14, a selection and/or weighting of optimization criteria for the fuel composition or the apportioning of the types of energy. For simple prescription of the optimization criteria it is possible to display two or more options and relationships between the options. At least two mutually influencing options can preferably be presented by means of a selection slider and/or spiders web diagrams and/or a two-dimensional or three-dimensional selection space for the selection of the optimization criteria. In this context, the optimization criteria can be positive, representing a value for an attained or attainable benefit, e.g. the reaching of maximum values, or negative, representing values for avoidance which has taken place or is possible or reduction (e.g. reduction of consumption, price, reduction of $CO_2$ emissions and reduction of costs etc.).

Alternatively or additionally, a set of possible setting changes for the adaptation of the energy supply can be determined as a function of the profile data record Rec and then the optimum fuel composition and/or the optimum apportioning of the types of energy can then be determined as a function of a further predefined selection of the setting changes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adapting an energy supply of a drive system of a vehicle, the method comprising the acts of:
   determining values of at least a first energy utilization characteristic variable ($K\_1$) which represents a first energy utilization process in the vehicle, and determining values of at least one parameter ($P\_1$) which represents at least one peripheral condition of the energy utilization in the vehicle during the first energy utilization process;
   determining a mathematical relationship between at least one or more of the values of the at least one energy utilization characteristic variable ($K\_1$) and the corresponding values of the parameters ($P\_1$) of the at least one peripheral condition for the energy utilization, after which a profile data record (Rec) is made available which contains a data record and/or learning data on the basis of the at least one determined mathematical relationship;
   as a function of the profile data record (Rec) which is made available, determining and making available at least one adaptation information item (AI) for adapting the energy supply of the drive system of said vehicle for a second energy utilization process; and/or
   determining and making available an adaptation information item (AI) for adapting the energy supply of the drive system of a second vehicle for an energy utilization process; and
   adapting the energy supply of the drive system of said vehicle for the second energy utilization process based on the at least one adaptation information item; and/or
   adapting the energy supply of the drive system of the second vehicle for the energy utilization process based on the adaptation information item.

2. The method as claimed in claim 1, wherein the adaptation of the energy supply of the drive system of the first vehicle and/or of a second vehicle during a second energy utilization process takes place with respect to a second energy utilization characteristic variable ($K\_2$) which represents a second energy utilization process in the vehicle.

3. The method as claimed in claim 1, wherein the parameter ($P\_1$, $EP\_1$, $EE\_1$) which represents a peripheral condition of the energy utilization in the vehicle is determined as a function of driving state data in the vehicle which are determined as a function of the data of a surrounding sensor of the vehicle during the first energy utilization process.

4. The method as claimed in claim 1, wherein an energy parameter ($EP\_1$) of a type of energy which is utilized by the vehicle during an energy utilization process is determined and a reference is produced between the determined energy parameter ($EP\_1$) and the specified profile data record (Rec).

5. The method as claimed in claim 1, wherein an energy utilization characteristic variable ($K\_1$) which represents a first energy utilized process in the vehicle and/or a second energy utilization characteristic variable ($K\_2$) which represents a second energy utilization process in the vehicle and/or in a second vehicle represents at least one of the following variables:
   (i) a drive power and/or a drive torque,
   (ii) emission data with respect to exhaust gas of a combustion engine,
   (iii) data of a knocking sensor of a combustion engine,
   (iv) a value for environmental efficiency and/or for energy efficiency.

6. The method as claimed in claim 1, wherein
   at least one vehicle-specific influencing variable ($EE\_1$) of said first vehicle and/or one vehicle-specific influencing variable ($EE\_2$) of a second vehicle is determined with respect to a second energy utilization process, and
   the adaption information item (AI) is for adapting the energy supply of the drive system of the first vehicle and/or of a second vehicle during a second energy utilization process as a function of the determined vehicle-specific influencing variable ($EE\_1$) of the first vehicle and/or of the determined vehicle-specific influencing variable ($EE\_2$) of the second vehicle.

7. The method as claimed in claim 6, wherein
   the vehicle-specific influencing variable of a vehicle ($EE\_1$, $EE\_2$) is representative of a state and/or a residual operational capacity of at least one component of the vehicle.

8. The method as claimed in claim 6, wherein
   the vehicle-specific influencing variable of a vehicle ($EE\_1$, $EE\_2$) is representative of a predefined degree of reduction in wear and/or reduction in consumption or increase in residual operational capacity of at least one component of the vehicle.

9. The method as claimed in claim 1, wherein
   an assignment of at least two different types of energy and/or types of fuel to at least two specific time intervals and/or specific route intervals is made as a function of the profile data record (Rec) which is made available.

10. The method as claimed in claim 1, wherein
    an adaptation information item (AI) for adapting the energy supply of a drive system of a second vehicle can be influenced by the user of said second vehicle.

11. The method as claimed in claim 1, wherein
    in each case the profile data record (Rec) is determined and/or made available for a multiplicity of first vehicles and a resulting profile data record (Rec_res) is determined therefrom and made available, and the adaptation information item (AI) for adapting the energy supply of the drive system of a second vehicle is implemented using the resulting profile data record (Rec_res) which is made available.

12. The method as claimed in claim 1, wherein
as a function of an anticipated or predetermined use of a first vehicle and/or of a second vehicle, a profile data record (Rec) or a resulting profile data record (Rec_res) is assigned and/or adapted as a function of predefined similarity criteria, and
the assignment of a profile data record is made as a function of a predefined route section and/or a predefined type of route and/or the expected peripheral conditions of the energy utilization in a first vehicle or in a second vehicle during a second energy utilization process.

13. The method as claimed in claim 1, wherein
a quantity of setting changes for the drive system of the first vehicle is determined as a function of the profile data record (Rec) which is made available, and
the energy supply of a drive system of a second vehicle for a second energy utilization process is adapted as a function of a predefined selection of the setting changes.

14. The method as claimed in claim 1, wherein
a composition of a fuel in a fuel tank of the vehicle is determined, and
in order to supply energy for a subsequent energy utilization process, specific portions of various types of fuel and/or a mixing ratio of predefined fuel components of the fuel to be refueled are determined as a function of the current composition of the fuel and the adaptation information item (AI).

15. The method as claimed in claim 1, wherein
the determined mathematical relationship also takes into account a use parameter (NP) which represents at least one type of use of the vehicle during a first energy utilization process.

16. A method for adapting an energy supply of a drive system of a second vehicle as a function of at least one energy utilization process of at least a first vehicle, wherein
a profile data record (Rec, Rec_res) which is acquired as claimed in claim 1 is read in, and
one or more adaptation information items (AI) for adapting the energy supply of a drive system of the second vehicle are determined as a function of the acquired profile data record (Rec), and
the energy supply of the drive system of the second vehicle is adapted as a function of the determined adaptation information item (AI).

17. A device for adapting an energy supply of a drive system of at least one vehicle, the device comprising a processor that executes program code to:
determine values of at least a first energy utilization characteristic variable (K_1) which represents a first energy utilization process in the vehicle, and determining values of at least one parameter (P_1) which represents at least one peripheral condition of the energy utilization in the vehicle during the first energy utilization process;
determine a mathematical relationship between at least one or more of the values of the at least one energy utilization characteristic variable (K_1) and the corresponding values of the parameters (P_1) of the at least one peripheral condition for the energy utilization, after which a profile data record (Rec) is made available which contains a data record and/or learning data on the basis of the at least one determined mathematical relationship;
as a function of the profile data record (Rec) which is made available, determine and make available at least one adaptation information item (AI) for adapting the energy supply of the drive system of said vehicle for a second energy utilization process; and/or
determine and make available an adaptation information item (AI) for adapting the energy supply of the drive system of a second vehicle for an energy utilization process; and
adapt the energy supply of the drive system of said vehicle for the second energy utilization process based on the at least one adaptation information item; and/or
adapt the energy supply of the drive system of the second vehicle for the energy utilization process based on the adaptation information item.

18. A mobile user apparatus configured to carry out the method according to claim 1, in conjunction with the at least one vehicle and/or in conjunction with a remote computing unit.

19. A computer program product comprising a non-transitory computer readable medium having stored thereon program code that, when executed on a processor of a vehicle and/or a mobile user apparatus, carries out the method of:
determining values of at least a first energy utilization characteristic variable (K_1) which represents a first energy utilization process in the vehicle, and determining values of at least one parameter (P_1) which represents at least one peripheral condition of the energy utilization in the vehicle during the first energy utilization process;
determining a mathematical relationship between at least one or more of the values of the at least one energy utilization characteristic variable (K_1) and the corresponding values of the parameters (P_1) of the at least one peripheral condition for the energy utilization, after which a profile data record (Rec) is made available which contains a data record and/or learning data on the basis of the at least one determined mathematical relationship;
as a function of the profile data record (Rec) which is made available, determining and making available at least one adaptation information item (AI) for adapting the energy supply of the drive system of said vehicle for a second energy utilization process; and/or
determining and making available an adaptation information item (AI) for adapting the energy supply of the drive system of a second vehicle for an energy utilization process; and
adapting the energy supply of the drive system of said vehicle for the second energy utilization process based on the at least one adaptation information item; and/or
adapting the energy supply of the drive system of the second vehicle for the energy utilization process based on the adaptation information item.

20. The method as claimed in claim 1, wherein the adapting of the energy supply of the drive system of said vehicle and of the second vehicle adapts the energy supply with respect to a type of energy or a type of fuel or a fuel composition.

21. The device as claimed in claim 17, wherein the energy supply of the drive system of said vehicle and of the second vehicle is adapted with respect to a type of energy or a type of fuel or a fuel composition.

22. The computer program product according to claim 19, wherein the adapting of the energy supply of the drive system of said vehicle and of the second vehicle adapts the energy supply with respect to a type of energy or a type of fuel or a fuel composition.

\* \* \* \* \*